Oct. 18, 1932.                F. A. ROSS                1,882,943
                           FLEXIBLE SHAFT END
                          Filed Jan. 11, 1930
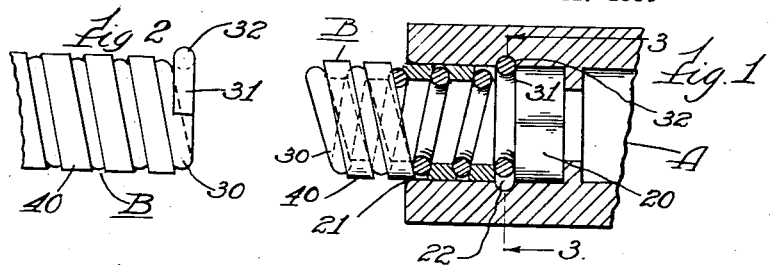
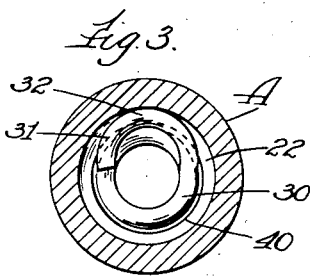
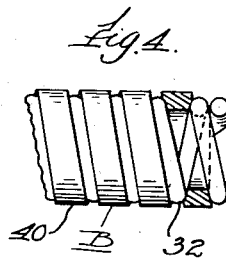
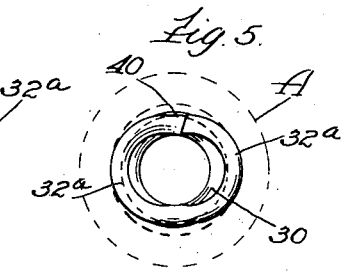
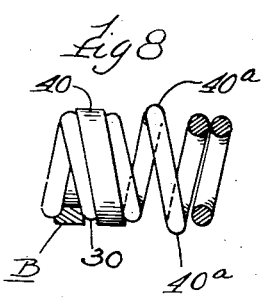
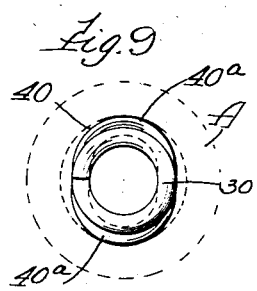
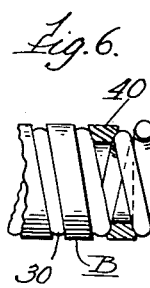
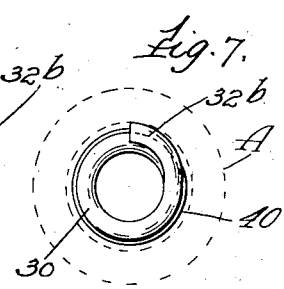
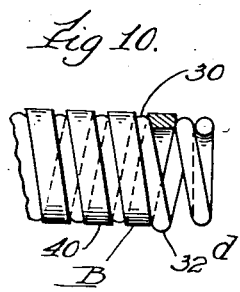
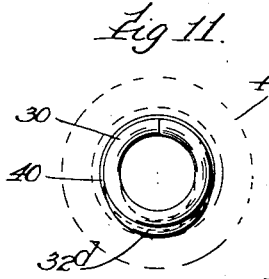
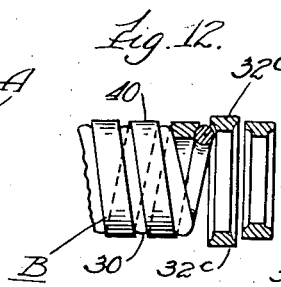
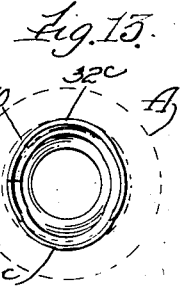
Inventor.
Frank A. Ross.
by Burton & Burton
his Attorneys
Witness
J. F. McKnight.

Patented Oct. 18, 1932

1,882,943

UNITED STATES PATENT OFFICE

FRANK A. ROSS, OF WILMETTE, ILLINOIS, ASSIGNOR TO STEWART-WARNER CORPORATION, OF CHICAGO, ILLINOIS, A CORPORATION OF VIRGINIA

FLEXIBLE SHAFT END

Application filed January 11, 1930. Serial No. 420,234.

The purpose of this invention is to provide an improved construction and method of forming the ends of the casing of a flexible shaft for securement thereto of the terminal fitting by which the flexible shaft is to be connected to the apparatus served. It consists in the elements and features of construction shown and described as indicated in the claims.

In the drawing:

Figure 1 is an axial section of a piece of flexible shaft casing shown connected at one end to a fitting shown in part and broken away as to the remainder, which may be understood as a coupling for joining two sections or unit lengths of flexible shafting, or as an inleading or outleading terminal of the mechanism from or to which power is to be communicated by the flexible shafting, this construction embodying the invention in one of its forms.

Figure 2 is a plan view of the end portion of the flexible shaft casing in Figure 1 disengaged from the fitting.

Figure 3 is an end view of the same.

Figure 4 is a view similar to Figure 2 showing a modified form of the shaft casing end adapted for engagement with the same form of fitting as shown in Figure 1.

Figure 5 is an end view of the same.

Figures 6 and 7 are respectively similar side and end views of a third form.

Figures 8 and 9 are similar side and end views of a fourth form.

Figures 10 and 11 are similar side and end views of a fifth form.

Figures 12 and 13 are similar side and end views of a sixth form.

It may be understood that for the usual and most familiar uses of flexible shaft the rotating element of the shaft is enclosed in a casing which is not rotated in the operation of the shaft, said casing consisting of inner and outer helical coils, the inner coil usually being of round wire, and the outer coil of wire having cross section adapting it to fit between the consecutive coils of the inner round wire spiral, so that the two coils together constitute a complete enclosure for the rotating shaft within. And it will be understood that such flexible sections of limited lengths are connected together for longer extent, and may be connected to the apparatus served, by coupling fittings which must be attached securely to the adjacent ends of the flexible shaft sections which are thereby coupled together, and securely to the extreme ends of the fully assembled flexible shaft which the end fittings are adapted to secure to the apparatus served, or for which the apparatus is formed with the equivalent of such fitting at the point at which the flexible shaft is to be connected.

The present invention is directed to formation of the flexible shaft casing and the coupling or terminal fitting for readily and securely engaging the casing with the coupling and terminal fittings or equivalent connections formed on the apparatus served.

The expedient which characterizes the invention in all the forms shown consists in providing in the cavity of the fitting to which the flexible shaft is to be joined an interior circumferential groove, preferably quite near the end at which the shaft is to be entered, and deforming or distorting a coil of one of the helical elements of the flexible shaft casing in such manner as to cause a segment of the distorted coil to protrude laterally from the cylindrical contour of the casing for engagement in the groove mentioned, when the shaft end is forced into the mouth of the fitting, which is easily done, notwithstanding the protruding segment of the coil, because the helical casing element is resilient and the deformed coil will yield back to its normal circular shape in passing into the mouth of the fitting, which may be slightly beveled to facilitate the entrance of the shaft casing; and when the protruding coil segment arrives at the groove it will snap out to the deformed shape, and the protruding segment will engage the groove; and by reason of the sides of the groove being abrupt, the engagement will be quite positive and disengagement will not be caused by any pull likely to occur in any normal operation of the apparatus.

Referring to the drawing:

A represents a portion of the fitting having the cavity, 20, with the mouth, 21, into which the flexible shaft casing, B, is inserted as described. 30 is the inner helical casing element customarily made of round wire, as shown. 40 is the outer helical casing element customarily made of wire formed in cross section, as shown, to seat between the coils of the inner helical casing element. In the forms shown in Figures 1, 2 and 3, the first two coils of the outer helix, 40, are cut away to expose the corresponding coils of the inner helix, 30, and the end coil, 31, of the inner helix is deformed to protrude a segment thereof as seen at 32, for engaging the groove, 22, formed in the encompassing wall of the cavity, 20, of the fitting, A.

In the forms shown in Figures 4 and 5, the end coil of the helix, 30, is deformed by flattening it in one diametric direction, causing it to protrude at both sides in the transverse diametric direction, forming two protruding segments, 32ª, 32ª, both of which will engage the groove, 22, when the casing is forced into the mouth of the fitting, A.

In the forms shown in Figures 6 and 7, instead of producing the protrusion by flattening the coil, such protrusion is produced by flexing outwardly the end portion of the end coil, as most plainly seen at 32$^b$ in Figure 6.

In the forms shown in Figures 8 and 9 the outer helical casing member is cut away to expose four coils of the inner helix, and the second or third coil of said inner helix is deformed by flattening the coil in one diametric direction, producing opposite protruding segments 32$^c$, 32$^c$, in a transverse diametric direction.

The form shown in Figures 10 and 11 is similar to the last preceding form, except that the deformation consists in a protruding segment of the second coil at one side only, as seen at 32$^d$.

In the form shown in Figures 12 and 13, the first two coils of the inner helical casing element, are cut away, and the corresponding coils of the outer helix,—as shown in the second coil,—is deformed by flattening in one diametric direction, producing oppositely positioned segments, 40ª, 40ª, protruding in a transverse diametric direction.

The operation of all these forms is the same as first above described.

I claim:

1. In combination with a flexible shaft casing formed comprising a resilient helical coil, a terminal fitting having a cavity dimensioned to admit the end of the casing by direct thrust of the casing thereinto, and having at a point toward the inner end of the cavity an interior circumferential groove, constituting a recess in the wall of the cavity increasing by the amount of the depth of the recess the radius of the cavity at that point beyond the dimension necessary to admit the coil by direct thrust, the casing having near the end a coil distorted outwardly to form a protrusion projecting radially outward with respect to the helical coil adapted to resiliently engage said groove when the end of the shaft casing is forced into the mouth of the cavity of the fitting.

2. In the construction defined in claim 1, the casing comprising two helical coils, one outside the other, and having one of said helical coils cut away adjacent the distorted turn of the other coil.

3. In the construction defined in claim 1, the flexible shaft casing comprising two helical coils, and having one or more of the helical turns of one of said coils removed, the other coil having one of the corresponding turns distorted to form the protrusion for engaging the groove of the fitting.

4. In the construction defined in claim 1, the distorted turn of the casing coil being thus distorted so as to form two outwardly protruding segments at opposite sides of the coil.

5. In the construction defined in claim 1, the shaft casing comprising two helical coils, one outside the other, the distorted coil being the inner of the two, the outer casing coil having the turns adjacent to the distortion of the inner coil cut away to expose said distorted part for engagement with the groove.

In testimony whereof, I have hereunto set my hand at Chicago, Illinois, this 7th day of January, 1930.

FRANK A. ROSS.